US012290860B2

(12) United States Patent
Benson et al.

(10) Patent No.: US 12,290,860 B2
(45) Date of Patent: May 6, 2025

(54) NEAR NET SHAPE MANUFACTURING OF COMPLEX CONFIGURATION COMPONENTS

(71) Applicant: Goodrich Corporation, Charlotte, NC (US)

(72) Inventors: Callie L Benson, Brooklyn, CT (US); Sergey Mironets, Philadelphia, PA (US); Roque Panza Giosa, Oakville (CA)

(73) Assignee: GOODRICH CORPORATION, Charlotte, NC (US)

( * ) Notice: Subject to any disclaimer, the term of this patent is extended or adjusted under 35 U.S.C. 154(b) by 56 days.

(21) Appl. No.: 18/160,941

(22) Filed: Jan. 27, 2023

(65) Prior Publication Data

US 2024/0253120 A1     Aug. 1, 2024

(51) Int. Cl.
*B22F 3/16* (2006.01)
*B22F 3/00* (2021.01)
*B22F 3/12* (2006.01)

(52) U.S. Cl.
CPC ............... *B22F 3/16* (2013.01); *B22F 3/003* (2013.01); *B22F 3/1208* (2013.01); *B22F 2201/11* (2013.01); *B22F 2201/20* (2013.01)

(58) Field of Classification Search
CPC .......... B22F 3/16; B22F 3/003; B22F 3/1208; B22F 2201/11; B22F 2201/20
See application file for complete search history.

(56) References Cited

U.S. PATENT DOCUMENTS

| 4,644,942 A * | 2/1987 | Sump ................. A61L 27/04 419/36 |
| 2013/0039799 A1* | 2/2013 | Bono .................. B60J 7/203 419/38 |
| 2013/0220570 A1* | 8/2013 | Sears .................. B22C 9/10 164/34 |
| 2020/0139435 A1 | 5/2020 | Mironets et al. |
| 2021/0016499 A1* | 1/2021 | Olevsky ............ B22F 5/003 |

FOREIGN PATENT DOCUMENTS

| CN | 110340366 | 10/2020 |
| WO | 2016030654 | 3/2016 |
| WO | 2021069719 | 4/2021 |

OTHER PUBLICATIONS

Upadhyay, et al., "3D printing for rapid sand casting—A review", Journal of Manufacturing Processes, vol. 29, dated Aug. 12, 2017, pp. 211-220, DOI: 10.1016/J.JMAPRO.2017.07.017.
European Patent Office, European Search Report dated May 2, 2024 in Application No. 24154417.0.

* cited by examiner

*Primary Examiner* — Ricardo D Morales
(74) *Attorney, Agent, or Firm* — SNELL & WILMER L.L.P.

(57) ABSTRACT

A method for manufacturing near net shapes of complex configuration components. The method includes mixing a plurality of powdered metals to form a blended powder; gravity sintering a sand mold filled with the blended powder to form a gravity sintered preform; and vacuum hot-pressing the gravity sintered preform to form a near net shape component.

7 Claims, 4 Drawing Sheets

NEAR NET SHAPE MANUFACTURING OF COMPLEX CONFIGURATION COMPONENTS

FIELD

The disclosure generally relates to the manufacture of feedstock for producing aerospace components via additive manufacturing processes and more particularly to methods of manufacture for rod feedstock being produced from titanium and other metallic powders.

BACKGROUND

Aircraft landing gear designs incorporate large structural components made from high strength alloys, such as titanium alloys. Powder based additive manufacturing techniques, such as powder bed, for high-strength alloy landing gear components are unsuited for producing large parts.

SUMMARY

A method for manufacturing near net shapes of complex configuration components is disclosed herein. The method includes mixing a plurality of powdered metals or metal alloys to form a blended powder; gravity sintering a sand mold filled with the blended powder to form a gravity sintered preform; and vacuum hot-pressing the gravity sintered preform to form a near net shape component.

In various embodiments, sand mold is printed as a single monolithic mold. In various embodiments, the sand mold is printed in two halves and joined together to form the sand mold. In various embodiments, the sand mold is printed in sections as per an established powder filling sequence that addresses powder filling in hard to access areas and mold disassembly after gravity sintering. In various embodiments, a size of the sand mold is adjusted in consideration of shrinkage after sintering and machining allowances. In various embodiments, surfaces of the sand mold that receive the blended powder are coated with a release agent to facilitate a surface finish of the gravity sintered preform and improve release of the gravity sintered preform.

In various embodiments, the method includes vibrating the sand mold to reduce mechanical interlocking of powder particles in the blended powder and increase a density of the blended powder. In various embodiments, the gravity sintering includes generate a vacuum in or purge with an inert gas a protective atmosphere of a furnace in which the sand mold filled with the blended powder is placed to a first atmosphere; raising a temperature of the furnace to a first temperature; and holding the furnace at the first atmosphere and the first temperature for a first predetermined time period to allow for hydrogen ($H_2$) evolution. In various embodiments, the gravity sintering further includes, responsive to the first predetermined time period expiring, raising the temperature of the furnace to a second temperature, wherein the second temperature is greater than the first temperature; and holding the furnace at the first atmosphere and the second temperature for a second predetermined time period to allow for homogenization. In various embodiments, the gravity sintering further includes, responsive to the second predetermined time period expiring, raising the protective atmosphere to a second atmosphere, wherein the second atmosphere is greater than the first atmosphere; raising the temperature of the furnace to a third temperature, wherein the third temperature is greater than the second temperature and the first temperature; and holding the furnace at the second atmosphere and the third temperature for a third predetermined time period. In various embodiments, the gravity sintering further includes, responsive to the third predetermined time period expiring, backfilling the protective atmosphere with argon gas to purge any hydrogen ($H_2$) that has been generated during the gravity sintering; and holding the furnace with the argon gas at the third temperature for a fourth predetermined time period.

Also disclosed herein is a system including a powder blender configured to mix a plurality of powdered metals or metal alloys to form a blended powder; a gravity sintering furnace configured to gravity sinter a sand mold filled with the blended powder to form a gravity sintered preform; and a vacuum hot-pressing die configured to vacuum hot-presses the gravity sintered preform to form a near net shape component.

In various embodiments, surfaces of the sand mold that receive the blended powder are coated with a release agent to facilitate a surface finish of the gravity sintered preform and improve release of the gravity sintered preform. In various embodiments, the system further includes a sand mold printer configured to print the sand mold; and a vibration mechanism configured to vibrate the sand mold to reduce mechanical interlocking of powder particles in the blended powder and increase a density of the blended powder.

In various embodiments, the gravity sintering furnace is further configured to generate a vacuum in purge with an inert gas a protective atmosphere of a furnace in which the sand mold filled with the blended powder is placed to a first atmosphere; raise a temperature of the furnace to a first temperature; and hold the furnace at the first atmosphere and the first temperature for a first predetermined time period to allow for hydrogen ($H_2$) evolution. In various embodiments, the gravity sintering furnace is further configured to: responsive to the first predetermined time period expiring, raise the temperature of the furnace to a second temperature, wherein the second temperature is greater than the first temperature; and hold the furnace at the first atmosphere and the second temperature for a second predetermined time period to allow for homogenization. In various embodiments, the gravity sintering furnace is further configured to: responsive to the second predetermined time period expiring, raise the protective atmosphere to a second atmosphere, wherein the second atmosphere is greater than the first atmosphere; raise the temperature of the furnace to a third temperature, wherein the third temperature is greater than the second temperature and the first temperature; and hold the furnace at the second atmosphere and the third temperature for a third predetermined time period. In various embodiments, the gravity sintering furnace is further configured to: responsive to the third predetermined time period expiring, backfill the protective atmosphere with argon gas to purge any hydrogen ($H_2$) that has been generated during the gravity sintering; and hold the furnace with the argon gas at the third temperature for a fourth predetermined time period.

Also disclosed herein is a method for manufacturing near net shapes of complex configuration components. The method includes mixing a plurality of powdered metals or metal alloys to form a blended powder; vibrating a sand mold to reduce mechanical interlocking of powder particles in the blended powder and increase a density of blended powder; gravity sintering the sand mold filled with the blended powder to form a gravity sintered preform; and vacuum hot-pressing the gravity sintered preform to form a near net shape component.

In various embodiments, the sand mold is printed as either a single monolithic mold or in two halves and joined together to form the sand mold. In various embodiments, the sand mold is printed in sections as per an established powder filling sequence that addresses powder filling in hard to access areas and mold disassembly after gravity sintering.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
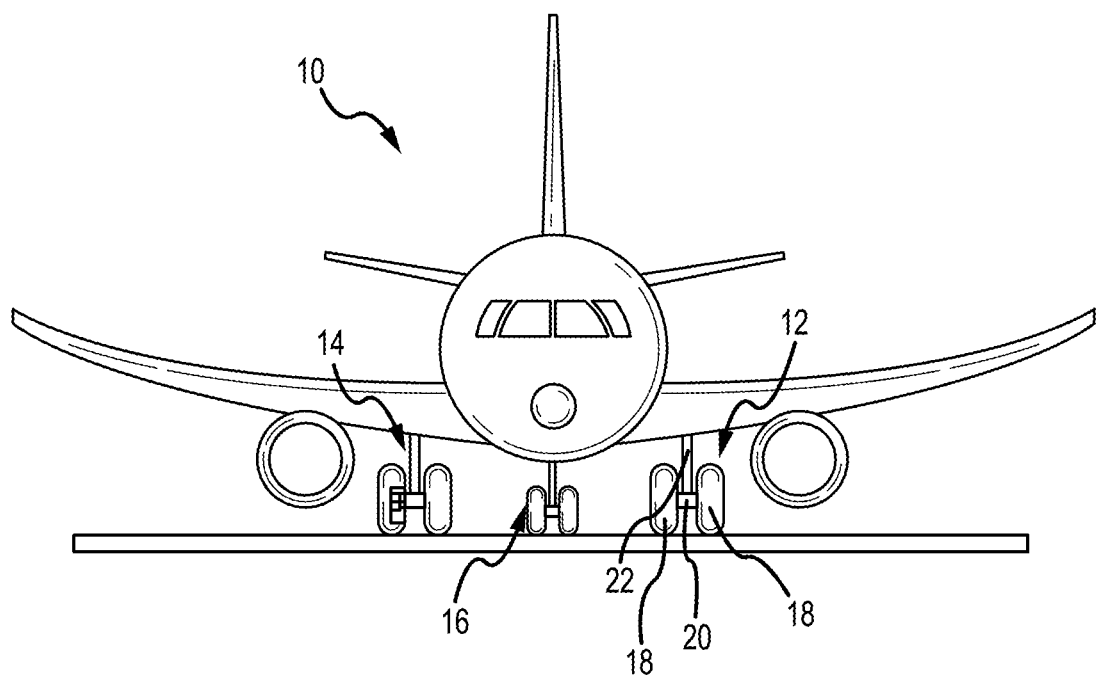
FIG. 1 illustrates an aircraft in accordance with various embodiments that may comprise aircraft systems and components, in accordance with various embodiments.
Figure 1:
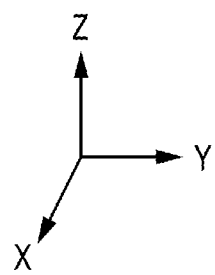

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Again, aircraft landing gear designs incorporate large structural components made from high strength alloys, such as titanium alloys. Inherent issues with generating large structural components may include expensive allow powder, low yield of inert gas atomization, and post-sintering hot isostatic press processing needed to eliminate residual porosity in the parts for high performance. While current processes address cost concerns to a certain extent, post processing operations are still of concern in terms of cost competitiveness with conventional manufacturing processes.

Disclosed herein is a method of manufacturing near net shapes of complex configuration components. In various embodiments, elemental metal powders are mixed to form a blended powder. In various embodiments, a three-dimensional (3D) sand mold is printed. In various embodiments, the printed sand mold is filled with the blended powder, placed in a protective atmosphere furnace, and gravity sintered to produce a porous preform with a specific geometrical configuration suitable for hot pressing. In various embodiments, after gravity sintering, the gravity sintered preform is removed from the sand mold and placed into a vacuum hot-pressing die so that the gravity sintered preform may consolidate to full density and near net shape component configuration. In various embodiments, once the vacuum hot-pressing is complete, the near net shape component may be hot forged or extruded to a predefined reduction ratio to achieve a highly robust structurally capable component. For example, the near net shape component 220 may be hot forged or extruded with a reduction ratio of 35% minimum to achieve the highly robust structurally capable component.

With reference to FIG. 1, an aircraft 10 in accordance with various embodiments that may comprise aircraft systems and components. For example, the aircraft 10 may comprise one or more landing gear such as landing gear 12, landing gear 14, and landing gear 16. The landing gear 12, the landing gear 14, and the landing gear 16 that may generally support the aircraft 10 when the aircraft 10 is not flying, allowing the aircraft 10 to taxi, take off, and land without damage and may comprise wheels and an oleo strut, also referred to as a shock strut, comprising a strut cylinder and a strut piston filled with a hydraulic fluid. For example, the landing gear 12 may include wheels 18 coupled by an axle 20 and a shock strut 22. In operation, aircraft landing gear may experience significant forces such as landing loads and aerodynamic loads and may tend to benefit from high performance alloy construction. In various embodiments, the aircraft 10 components such as the landing gear 12 and the shock strut 22 may comprise complex geometries tending to benefit from additive manufacturing techniques.

Figure 2:
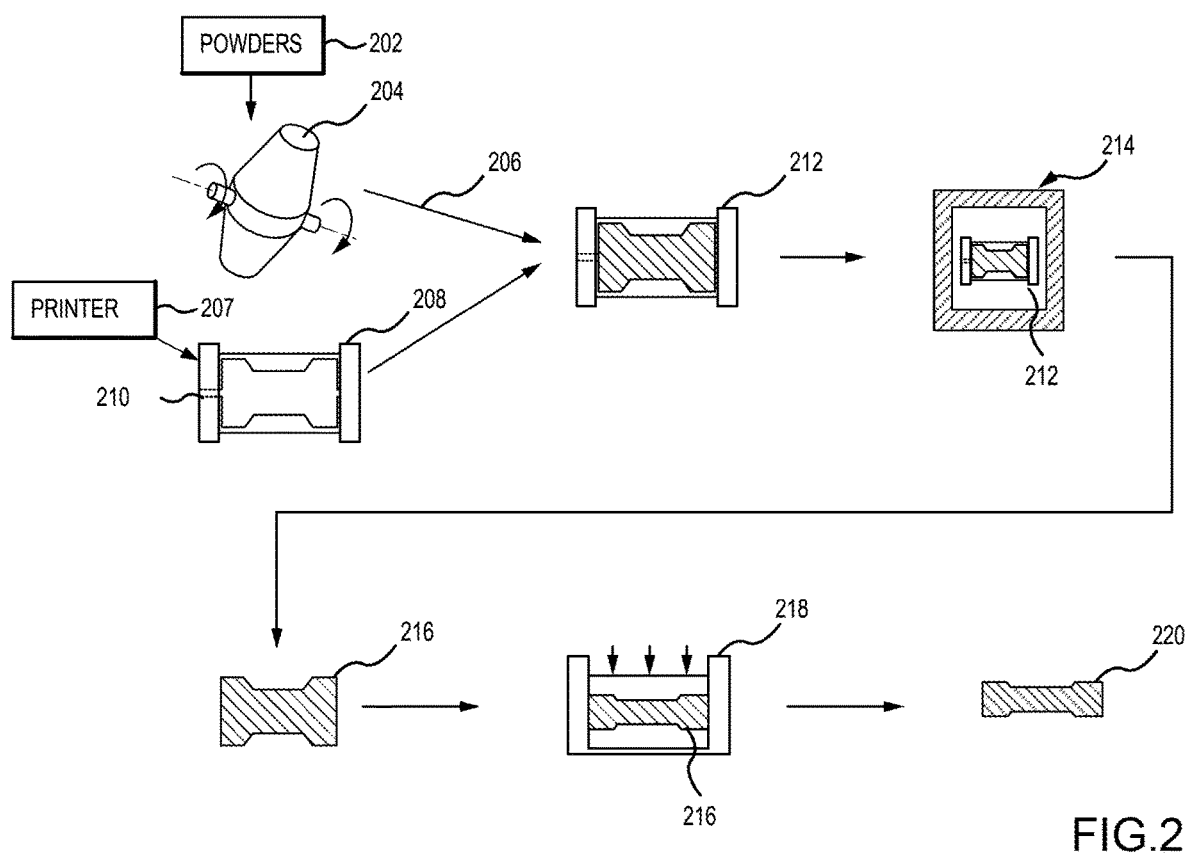
FIG. 2 illustrates a method of manufacturing near net shapes of complex configuration components, in accordance with various embodiments.

Referring now to FIG. 2, a method of manufacturing near net shapes of complex configuration components is illustrated, in accordance with various embodiments. In various embodiments, elemental metal powders 202, i.e., a plurality of powdered metals and/or metal alloys, such as titanium hydride ($Ti_2H$), aluminum (Al), vanadium (V), and iron (Fe), among others, are added to a powder blender 204 and blended to consistency to form a blended powder 206. In various embodiments, if the complex configuration component is specific with regard to horizontal (x-direction and y-direction) or vertical (z-direction) orientation or at certain angle, then a part powder filling orientation may be optimized to form a powder filling sequence. In various embodiments, if the complex configuration component is a single component, then a three-dimensional (3D) sand mold printer 207 prints a 3D sand mold 208. In various embodiments, if the complex configuration component is formed from in various sections due to horizontal (x-direction and y-direction) or vertical (z-direction) orientation or angle, then the 3D sand mold printer 207 prints a modular stackable sand mold 208 in sections as per an established powder filling sequence to address better powder filling in hard to access areas and also mold disassembly after gravity sintering. In various embodiments, the printed sand mold or modular stackable sand mold 208 is printed from a mixture of sand and a polymer binding agent, such as cyanoacrylate or epoxy resin, among others. In various embodiments, the printed sand mold or modular stackable sand mold 208 may be reusable. In various embodiments, the printed sand mold or modular stackable sand mold 208 may be printed as a single, monolithic mold. In various embodiments, the printed sand mold or modular stackable sand mold 208 may be printed in two halves and then joined or held together. In various embodiments, a size of the printed sand mold or modular stackable sand mold 208 is adjusted in consideration of shrinkage after sintering and machining allowances. In various embodiments, the inside surfaces of the printed sand mold or modular stackable sand mold 208 that receive the blended powder 206 may be coated with one or more release agents, such an emulsion or dispersion, among others, to facilitate better preform surface finish and improve the preform release. In various embodiments, the printed sand mold or modular stackable sand mold 208 is filled via an opening 210 with the blended powder 206. In various embodiments, each module of the modular stackable sand mold or modular stackable sand mold 208 is filled via an opening 210 with the blended powder 206 and stacked as per the established powder filling sequence. In various embodiments, as the printed sand mold or modular stackable sand mold 208 is filled with the blended powder 206, the printed sand mold or modular stackable sand mold 208 may be vibrated via a vibration mechanism in order to tend to reduce mechanical interlocking of powder particles and to increase the apparent density of blended powder, i.e., by compacting the blended powder 206.

In various embodiments, the printed sand mold with compacted powder 212 is placed in a gravity sintering furnace 214. In various embodiments, a protective atmosphere of the gravity sintering furnace 214 may be a vacuum, such as a neutral vacuum or inert gas-filled vacuum. In various embodiments, the gas may be argon (Ar), nitrogen ($N_2$), or helium (He), among others. In various embodiments, the printed sand mold with compacted powder 212 is gravity sintered to produce a porous preform with a specific geometrical configuration suitable for hot pressing. In various embodiments, the gravity sintering parameters of the gravity sintering furnace 214 may include drawing a vacuum of the protective atmosphere to between $10^{-4.5}$ torr (0.00421 Pa) and $10^{-5.5}$ torr (0.00042 Pa). In various embodiments, the gravity sintering parameters of the gravity sintering furnace 214 may include drawing a vacuum of the protective atmosphere to between $10^{-4.1}$ torr (0.00211 Pa) and $10^{-5.2}$ torr (0.00084 Pa). In various embodiments, the gravity sintering parameters of the gravity sintering furnace 214 may include drawing a vacuum of the protective atmosphere to $10^{-5}$ torr (0.00133 Pa). In various embodiments, while the atmosphere is being reduced, the temperature of the gravity sintering furnace 214 may be increased to between 820° F. (437.8 degree Celsius) and 870° F. (465.6 degree Celsius) in increments of 5° F. (−15 degree Celsius) per minute, 8° F. (−13.33 degree Celsius) per minute, or 10° F. (−12.22 degree Celsius) per minute, with a predefined hold between increments. In various embodiments, while the atmosphere is being reduced, the temperature of the gravity sintering furnace 214 may be increased to between 830° F. (443.3 degree Celsius) and 855° F. (457.2 degree Celsius) in increments of 5° F. (−15 degree Celsius) per minute, 8° F. (−13.33 degree Celsius) per minute, or 10° F. (−12.22 degree Celsius) per minute, with a predefined hold between increments. In various embodiments, while the atmosphere is being reduced, the temperature of the gravity sintering furnace 214 may be increased to 842° F. (450 degree Celsius) in increments of 5° F. (−15 degree Celsius) per minute, 8° F. (−13.33 degree Celsius) per minute, or 10° F. (−12.22 degree Celsius) per minute, with a predefined hold between increments. In various embodiment, once the first temperature level is reached, then the temperature of the gravity sintering furnace 214 is held for a first predetermined time period to allow for hydrogen ($H_2$) evolution. In various embodiments, the first predetermined time period may be for between 50 minutes and 70 minutes. In various embodiments, the first predetermined time period may be for between 55 minutes and 65 minutes. In various embodiments, the first predetermined time period may be 60 minutes.

In various embodiments, after the first predetermined time period has expired, the temperature of the gravity sintering furnace 214 may be increased to between 1500° F. (815.6 degree Celsius) and 1550° F. (843.3 degree Celsius) in increments of 3° F. (−16.11 degree Celsius) per minute, 4° F. (−15.56 degree Celsius) per minute, or 5° F. (−15 degree Celsius) per minute, with a predefined hold between increments. In various embodiments, after the first predetermined time period has expired, the temperature of the gravity sintering furnace 214 may be increased to between 1520° F. (826.7 degree Celsius) and 1530° F. (832.2 degree Celsius) in increments of 3° F. (−16.11 degree Celsius) per minute, 4° F. (−15.56 degree Celsius) per minute, or 5° F. (−15 degree Celsius) per minute, with a predefined hold between increments. In various embodiments, after the first predetermined time period has expired, the temperature of the gravity sintering furnace 214 may be increased to 1525° F. (829.4 degree Celsius) in increments of 3° F. (−16.11 degree Celsius) per minute, 4° F. (−15.56 degree Celsius) per minute, or 5° F. (−15 degree Celsius) per minute, with a predefined hold between increments. In various embodiment, once the second temperature level is reached, then the temperature of the gravity sintering furnace 214 is held for a second predetermined time period to allow for homogenization of the melted compacted powder 212. In various embodiments, the second predetermined time period may be for between 100 minutes and 140 minutes. In various embodiments, the second predetermined time period may be for between 110 minutes and 130 minutes. In various embodiments, the second predetermined time period may be 120 minutes.

In various embodiments, after the second predetermined time period has expired, the protective atmosphere may be raised to between $10^{-1.5}$ torr (4.2160 Pa) and $10^{-2.5}$ torr (0.42160 Pa). In various embodiments, the protective atmosphere may be raised to between $10^{-1.8}$ torr (2.1130 Pa) and $10^{-2.2}$ torr (0.84120 Pa). In various embodiments, the protective atmosphere may be raised to $10^{-2}$ torr (1.3332 Pa). Once the protective atmosphere has been changed, the temperature of the gravity sintering furnace 214 may be increased to between 2000° F. (1093 degree Celsius) and 2200° F. (1204 degree Celsius) in increments of 5° F. (−15 degree Celsius) per minute, 8° F. (−13.33 degree Celsius) per minute, or 10° F. (−12.22 degree Celsius) per minute, with a predefined hold between increments. In various embodiments, the temperature of the gravity sintering furnace 214 may be increased to between 2050° F. (1121 degree Celsius) and 2150° F. (1177 degree Celsius) in increments of 5° F. (−15 degree Celsius) per minute, 8° F. (−13.33 degree Celsius) per minute, or 10° F. (−12.22 degree Celsius) per minute, with a predefined hold between increments. In various embodiments, the temperature of the gravity sintering furnace 214 may be increased to 2100° F. (1149 degree Celsius) in increments of 5° F. (−15 degree Celsius) per minute, 8° F. (−13.33 degree Celsius) per minute, or 10° F. (−12.22 degree Celsius) per minute, with a predefined hold between increments. In various embodiment, the temperature of the gravity sintering furnace 214 is held for a third predetermined time period. In various embodiments, the third predetermined time period may be for between 100 minutes and 140 minutes. In various embodiments, the third predetermined time period may be for between 110 minutes and 130 minutes. In various embodiments, the third predetermined time period may be 120 minutes.

In various embodiments, after the third predetermined time period has expired, if the protective atmosphere is not already an argon (Ar) vacuum, the protective atmosphere may be backfilled with argon (Ar) gas to purge any hydrogen ($H_2$) that may have been generated during the gravity sintering. In various embodiments, after the protective atmosphere has been backfilled with argon (Ar) gas, the printed sand mold with the formed porous preform is held in the argon (Ar) vacuum for a fourth predetermined time period to complete sintering. In various embodiments, the fourth predetermined time period may be for between 50 minutes and 70 minutes. In various embodiments, the fourth predetermined time period may be for between 55 minutes and 65 minutes. In various embodiments, the fourth predetermined time period may be 60 minutes. The further predetermined time period allows the formed porous preform to complete sintering to about 85-90% of theoretical density providing sufficient mechanical strength to remove the gravity sintered preform 216 from the gravity sintering mold and transfer the gravity sintered preform to a vacuum hot press.

Therefore, in various embodiments, after the fourth predetermined time period has expired, the gravity sintered preform 216 is removed from the sand mold and placed into a vacuum hot-pressing die 218 so that the gravity sintered preform 216 may consolidate to full density and near net shape component configuration. In various embodiments, once the vacuum hot-pressing is complete, the near net shape component 220 may be hot forged or extruded to a predefined reduction ratio to achieve a highly robust structurally capable component. For example, the near net shape component 220 may be hot forged or extruded with a reduction ratio of 35% minimum to achieve the highly robust structurally capable component.

Figure 3:
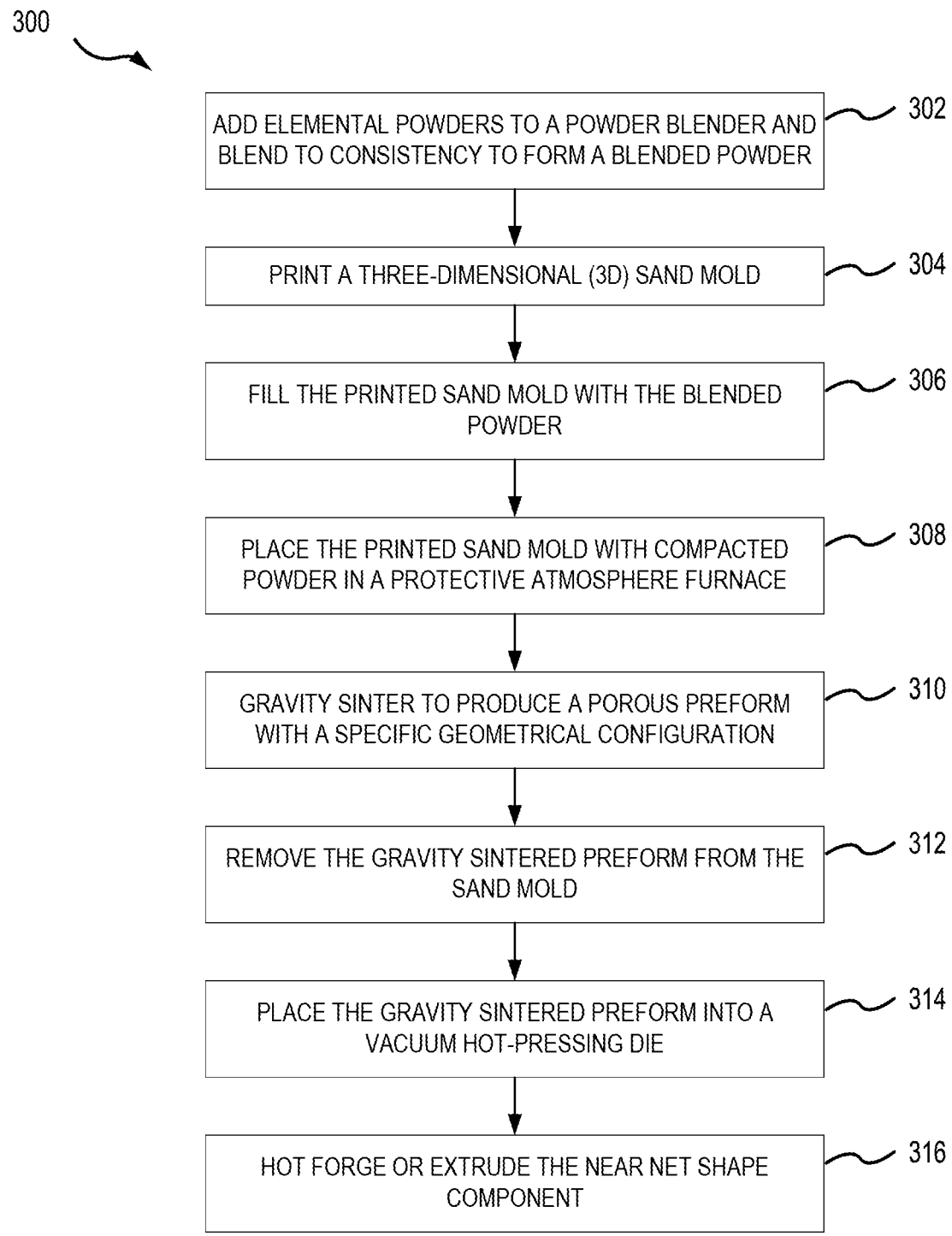
FIG. 3 illustrates a flow diagram of a method for manufacturing near net shapes of complex configuration components, in accordance with various embodiments.

Referring now to FIG. 3, a flow diagram of a method 300 for manufacturing near net shapes of complex configuration components is illustrated, in accordance with various embodiments. In various embodiments, at block 302, elemental metal powders are added to a powder blender and blended to consistency to form a blended powder. In various embodiments, at block 304, a three-dimensional (3D) sand mold is printed. In various embodiments, at block 306, the printed sand mold is filled via an opening with the blended powder. In various embodiments, at block 308, the printed sand mold with compacted powder is placed in a protective atmosphere furnace. In various embodiments, at block 310, the printed sand mold with compacted powder is gravity sintered to produce a porous preform with a specific geometrical configuration suitable for hot pressing. In various embodiments, at block 312, the gravity sintered preform is removed from the sand mold and, at block 314, the gravity sintered preform is placed into a vacuum hot-pressing die so that the gravity sintered preform may consolidate to full density and near net shape component configuration. In various embodiments, at block 316, the near net shape component may be hot forged or extruded to a predefined reduction ratio to achieve a highly robust structurally capable component. For example, the near net shape component 220 may be hot forged or extruded with a reduction ratio of 35% minimum to achieve the highly robust structurally capable component.

Figure 4:
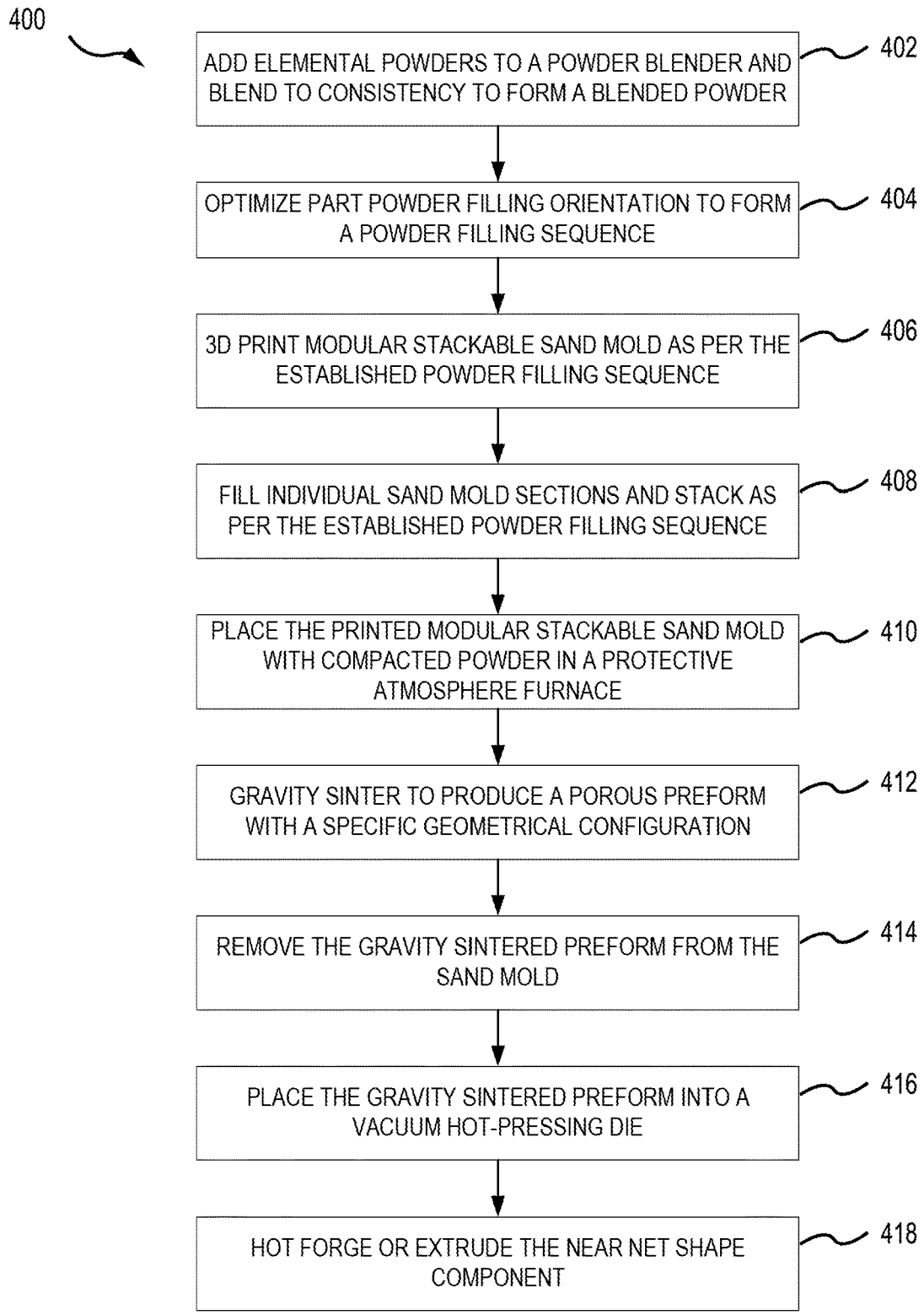
FIG. 4 illustrates a flow diagram of a method for manufacturing near net shapes of complex configuration components, in accordance with various embodiments

Referring now to FIG. 4, a flow diagram of a method 400 for manufacturing near net shapes of complex configuration components is illustrated, in accordance with various embodiments. In various embodiments, at block 402, elemental metal powders are added to a powder blender and blended to consistency to form a blended powder. In various embodiments, at block 404, a part powder filling orientation is optimized to form a powder filling sequence with regard to horizontal (x-direction and y-direction) or vertical (z-direction) orientation or angle. In various embodiments, at block 406, a modular stackable sand mold as per the established powder filling sequence is printed in various sections due to horizontal (x-direction and y-direction) or vertical (z-direction) orientation or angle. In various embodiments, at block 408, each module of the modular stackable sand mold is filled via an opening with the blended powder and stacked as per the established powder filling sequence. In various embodiments, at block 410, the printed modular stackable sand mold with compacted powder is placed in a protective atmosphere furnace. In various embodiments, at block 412, the printed sand mold with compacted powder is gravity sintered to produce a porous preform with a specific geometrical configuration suitable for hot pressing. In various embodiments, at block 414, the gravity sintered preform is removed from the sand mold and, at block 416, the gravity sintered preform is placed into a vacuum hot-pressing die so that the gravity sintered preform may consolidate to full density and near net shape component configuration. In various embodiments, at block 418, the near net shape component may be hot forged or extruded to a predefined reduction ratio to achieve a highly robust structurally capable component. For example, the near net shape component 220 may be hot forged or extruded with a reduction ratio of 35% minimum to achieve the highly robust structurally capable component.

Therefore, in various embodiments, by utilizing a combination of gravity sintering in 3D printed sand mold and vacuum hot pressing, an aerospace quality near net shape components may be produced. The gravity sintering further promotes diffusion bonding of elemental powder. Further, the gravity sintering in the protective atmosphere eliminates or minimizes oxygen pick up. Additionally, the blended and lightly compacted powder mixture has a substantial interconnected porosity beneficial for releasing hydrogen ($H_2$) during sintering and reducing powder surface oxidation. The gravity sintering parameters may be adjusted to facilitate the diffusion of alloying elements and sintering density of the preform. Hot pressing of the gravity sintered preform may be performed in a vacuum with a controlled deformation rate and processing temperature.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A system, comprising:
   a sand mold printer configured to print a modular stackable sand mold;
   a powder blender configured to mix a plurality of powdered metals or metal alloys to form a blended powder, wherein the plurality of powdered metals includes titanium hydride (Ti2H), aluminum (Al), vanadium (V), and iron (Fe);
   a gravity sintering furnace configured to gravity sinter the modular stackable sand mold filled with the blended powder to form a gravity sintered preform; and
   a vacuum hot-pressing die configured to vacuum hot-press the gravity sintered preform to form a near net shape component.

2. The system of claim 1, wherein surfaces of the modular stackable sand mold that receive the blended powder are coated with a release agent to facilitate a surface finish of the gravity sintered preform and improve release of the gravity sintered preform.

3. The system of claim 1, further comprising:
   a vibration mechanism configured to vibrate the modular stackable sand mold to reduce mechanical interlocking of powder particles in the blended powder and increase a density of the blended powder.

4. The system of claim 1, wherein the gravity sintering furnace is further configured to:
   generate a vacuum in or purge with an inert gas a protective atmosphere of a furnace in which the modular stackable sand mold filled with the blended powder is placed to a first atmosphere, wherein the first atmosphere is between $10^{-4.5}$ torr (0.00421 Pa) and $10^{-5.5}$ torr (0.00042 Pa);
   raise a temperature of the furnace to a first temperature, wherein the first temperature is between to between 820° F. (437.8° C.) and 870° F. (465.6° C.) in increments of at least one of 5° F. (−15° C.) per minute, 8° F. (−13.33°° C.) per minute, or 10° F. (−12.22° C.) per minute; and
   hold the furnace at the first atmosphere and the first temperature for a first predetermined time period to allow for hydrogen ($H_2$) evolution.

5. The system of claim 4, wherein the gravity sintering furnace is further configured to:
   responsive to the first predetermined time period expiring, raise the temperature of the furnace to a second temperature, wherein the second temperature is greater than the first temperature and wherein the second temperature is between 1500° F. (815.6° C.) and 1550° F. (843.3° C.) in increments of at least one of 3° F. (−16.11° C.) per minute, 4° F. (−15.56° C.) per minute, or 5° F. (−15° C.) per minute; and
   hold the furnace at the first atmosphere and the second temperature for a second predetermined time period to allow for homogenization.

6. The system of claim 5, wherein the gravity sintering furnace is further configured to:

responsive to the second predetermined time period expiring, raise the protective atmosphere to a second atmosphere, wherein the second atmosphere is greater than the first atmosphere and wherein the second atmosphere is between $10^{-1.5}$ torr (4.2160 Pa) and $10^{-2.5}$ torr (0.42160 Pa);

raise the temperature of the furnace to a third temperature, wherein the third temperature is greater than the second temperature and the first temperature and wherein the third temperature is between 2000° F. (1093° C.) and 2200° F. (1204° C.) in increments of at least one of 5° F. (−15° C.) per minute, 8° F. (−13.33° C.) per minute, or 10° F. (−12.22° C.) per minute; and hold the furnace at the second atmosphere and the third temperature for a third predetermined time period.

7. The system of claim 6, wherein the gravity sintering furnace is further configured to:

responsive to the third predetermined time period expiring, backfill the protective atmosphere with argon gas to purge any hydrogen ($H_2$) that has been generated during the gravity sintering; and hold the furnace with the argon gas at the third temperature for a fourth predetermined time period.

\* \* \* \* \*